(No Model.)
W. F. & H. C. REEVES.
COMBINED WEED CUTTER AND HARROW.
No. 346,173. Patented July 27, 1886.
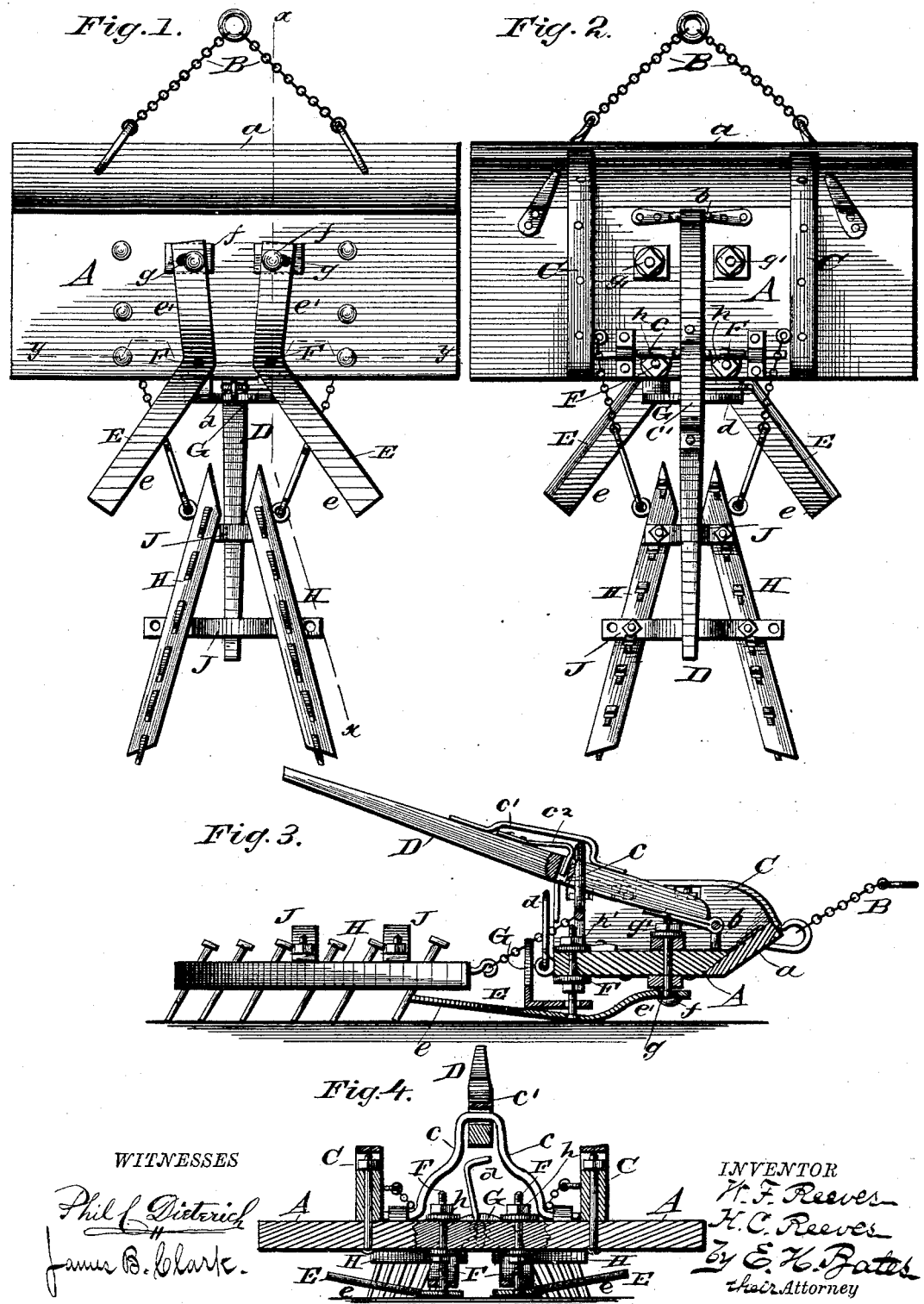

UNITED STATES PATENT OFFICE.

WILLIAM F. REEVES AND HENRY C. REEVES, OF MILTONVALE, KANSAS.

COMBINED WEED-CUTTER AND HARROW.

SPECIFICATION forming part of Letters Patent No. 346,173, dated July 27, 1886.

Application filed November 5, 1885. Serial No. 181,889. (No model.)

*To all whom it may concern:*

Be it known that we, WILLIAM F. REEVES and HENRY C. REEVES, both citizens of the United States, residing at Miltonvale, in the county of Cloud and State of Kansas, have invented certain new and useful Improvements in a Combined Weed-Cutter and Harrow; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a bottom view of our combined weeder and harrow. Fig. 2 is a top view of the same. Fig. 3 is a vertical longitudinal sectional view taken in the plane indicated by the dotted lines $x\ x$ on Fig. 1; and Fig. 4 is a vertical transverse section through the same, taken in the plane indicated by dotted lines $y\ y$ on Fig. 1, looking rearward.

Our invention relates to farm implements which are designed for eradicating lands of weeds, from listed corn, and at the same time harrowing the land, and it has especial reference to improvements on the implement for which Letters Patent were granted to us bearing date of October 25, 1883, and numbered 287,163, which improvement will be fully understood from the following description when taken in connection with the annexed drawings.

Referring by letter to the accompanying drawings, A designates the main frame or drag, which is a flat platform turned up in front at $a$, and designed to lie upon the ground, over which it is drawn by a horse hitched to the draft-chain B. Equidistant from the middle of the length of the drag A, and on top thereof, are sled-runners C C, which are used when the machine is inverted, and on which the machine is moved from one place to another when not in actual operation.

D designates the handle, by means of which an attendant controls the machine while weeding. This handle is pivoted to a staple, $b$, and extends back in rear of the drag, and it is adjustably attached to the rear of the drag by means of a pivoted brace, $c$, a long staple, $c'$, and a spring-catch, $c^2$. By means of a hook, $d$, the handle D can be held up free from the ground when the machine is mounted on its runners C C.

E E designate two obtuse-angular blades, which are adjustably secured to the drag A, as will be hereinafter explained. The rear outwardly-diverging portions, $e\ e$, of said blades have their outer edges sharpened, for the purpose of cutting (with a draw-cut) the roots of weeds, and the forward portions, $e'\ e'$, of the blades are curved upward and forward beneath the bottom of the drag A, and are connected to it by means of bolts $f\ f$, which pass through lateral segmental slots $g\ g$, and through the drag, and have nuts $g'\ g'$ and washers applied to them. In rear of said slots $g\ g$, and at or near the angles of the blades E E, these blades are pivoted to vertical posts F F, the axis of which are the points with which the arcs of the slots $g\ g$ are coincident. The posts F F pass freely through holes made through the drag A, near its rear edge, and receive nuts $h\ h$ and washers, by means of which the cutting portions of the blades E E can be adjusted nearer to or farther from the bottom of the drag, and rigidly fixed to cut the weeds at any desired depth below the surface of the ground. It will thus be seen that by simply loosening the nuts $g'\ g'$ on the bolts $f\ f$ the cutting portions of the blades E E can be adjusted at any desired distance apart.

For the purpose of sustaining the posts F F against undue lateral strain, we employ an arched brace, G, the feet of which receive loosely through them the said posts, so that the brace is free to rise and descend and accommodate itself to the vertical adjustment given to the blades E E.

H H designate the side beams of a harrow, which beams are arranged obliquely to the line of draft and connected together by arched cross-braces J J, secured in such a manner as to allow the beams to be adjusted and fixed to run at any obliquity.

The teeth of the harrow are preferably pitched backward, and the front ends of the beams, which are separated from each other, as shown in the annexed drawings, are flexibly connected by chains, links, and eyebolts to the runners of the drag A.

From the above description it is obvious that the blades E E can be readily adjusted to cut the weeds at any desired depth below the surface of the ground, and also that their cutting portions can be adjusted at different distances apart. It will also be seen that the ground is harrowed during the weeding operation.

Having described our invention, what we claim, and desire to secure by Letters Patent, is—

1. The combination of the arched brace G with the vertically-adjustable posts F F, the obtuse-angular blades E E, pivoted to said posts and having segmental slots through them near their front ends, the pivoted bolts $f\,f$, and the drag A, constructed as described.

2. The combination, with the drag A, its adjustable cutters and arched brace, as described, of a harrow flexibly connected to the drag-runners and composed of separated beams connected by arched cross-braces J J, as shown and described.

In testimony whereof we affix our signatures in presence of two witnesses.

WILLIAM F. REEVES.
HENRY C. REEVES.

Witnesses:
H. G. McDONALD,
J. A. BROWNFIELD.